Jan. 17, 1950 C. J. VAN LOON ET AL 2,494,677

RADIO RECEIVER WITH CONDENSER TUNING

Filed March 1, 1947

CAREL JAN VAN LOON
WILLEM BEUKEMA
INVENTORS.

BY Fred M Vogel

AGENT.

Patented Jan. 17, 1950 2,494,677

UNITED STATES PATENT OFFICE 2,494,677

RADIO RECEIVER WITH CONDENSER TUNING

Carel Jan van Loon and Willem Beukema, Eindhoven, Netherlands, assignors to Hartford National Bank and Trust Company, Hartford, Conn., as trustee Application March 1, 1947, Serial No. 731,806
In the Netherlands November 13, 1942

Section 1, Public Law 690, August 8, 1946
Patent expires November 13, 1962

9 Claims. (Cl. 250—20)

The invention relates to radio receivers adapted to be tuned by means of one or more variable condensers. With such receivers trouble is often experienced from the so-called microphonic effect which consists in the production of a strong low-frequency oscillation due to acoustic feedback. The microphonic effect is produced as a rule due to the fact that the sound produced by the loud-speaker sets one of the variable condensers into vibration, in which event a periodic variation of the tuning of the receiver is produced with the result that the amplitude of the received signal is also periodically varied. After detection these amplitude variations give rise to a low-frequency tone of a frequency equal to that which was initially produced by the loud-speaker so that in the case of correct phase relations this tone can be entertained. In superheterodyne receivers it is more particularly the variable condenser of the oscillatory circuit which may give rise to the microphonic effect.

It is known to combat the microphonic effect by resiliently mounting the condensers, for example by mounting them on rubber feet but this step does not lead completely to the purpose in view since the resiliently mounted condensers generally have an excessively high natural frequency so that the production of microphonic oscillations of low frequency remains possible.

According to the invention, the microphonic effect is suppressed by supplying a direct-current voltage to at least one of the variable condensers so that for the vibrations produced by the loud-speaker this condenser acts as a microphone whilst, after amplification, the electrical oscillations thus produced act upon a capacity connected in parallel with the condenser in question in such manner that the initial capacity variations are counteracted.

The invention will be explained more fully with reference to the accompanying drawing.

Figure 1:
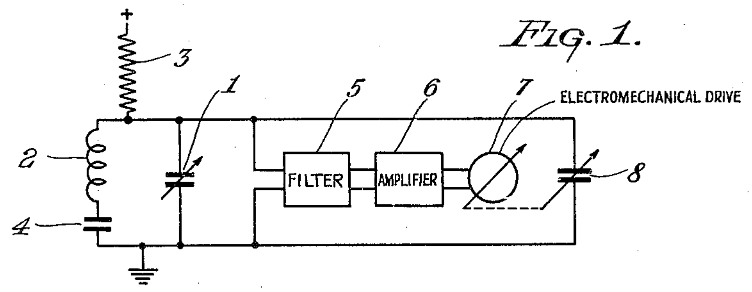

Fig. 1 represents an oscillatory circuit of a radio receiver, which circuit consists of a variable condenser 1 and an inductance coil 2. Under certain conditions the sound produced by the loud-speaker may set the condenser 1 into vibration with the result that the capacity of this condenser periodically varies, which may give rise to the production of the microphonic effect. According to the invention, in order to suppress this effect a direct-current voltage is supplied to the condenser 1 so that for the sound produced by the loudspeaker, this condenser acts as a condenser microphone. To that end, one of the ends of the oscillatory circuit is connected to earth whereas the other end is connected, through the intermediary of a resistance 3, to a point of positive potential. In order to avoid a short-circuit of the condenser 1 for direct current, a separating condenser 4 is connected in series with the coil 2. If the circuit 1, 2, 4 constitutes the oscillator circuit of a superheterodyne receiver, the condenser 4 may serve at the same time to maintain a constant difference between the tuning frequencies of this circuit and of the preselection circuits.

The low-frequency electrical oscillations produced by the condenser acting as a condenser microphone are separated by means of a filter 5 from the high-frequency oscillations occurring in the circuit 1, 2, 4 and are supplied to an amplifier 6. In the output circuit of the amplifier 6 is included a device 7 with the aid of which the capacity of a condenser 8 which is connected in parallel with the oscillatory circuit, can be varied, and this in such manner that, at least for the greater part, the capacity variations due to the vibrations of the condenser 1 are neutralized.

In the figure the device 7 is represented as a galvanometer system; in practice use may also advantageously be made of a device based upon the phenomenon of magnetostriction, as will hereinafter be described in detail. Instead of the device 7 and of the condenser 8 controlled thereby it would also be possible to utilize a so-called reactance tube which is controlled by the output voltage of the amplifier 6. By this term is meant a discharge tube wherein the control grid has applied to it an alternating voltage which is out of phase by approximately 90° with respect to the anode voltage so that the tube behaves as a reactance whose value is dependent upon the slope of the tube. The use of a reactance tube entails, however, the drawback that it is difficult to ensure that this tube operates in exactly the same manner for the high-frequency and for the low-frequency oscillations occurring in the oscillatory circuit. For this reason use should preferably be made of a mechanical device for varying the capacity connected in parallel with the condenser 1.

Figure 2:
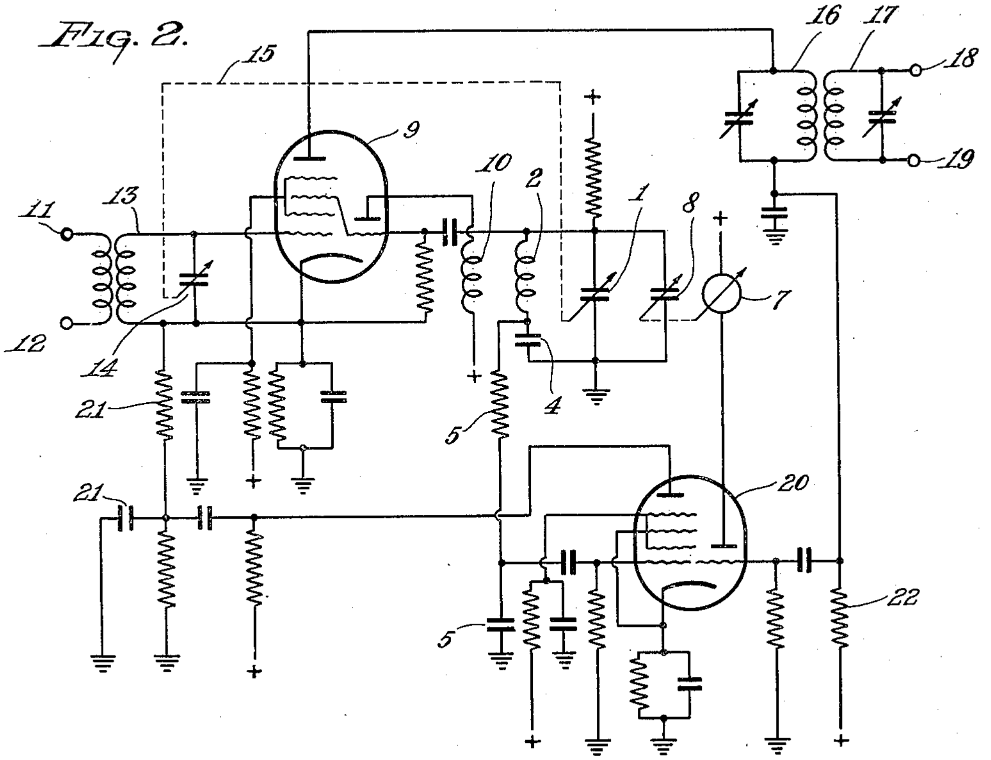

Fig. 2 represents, by way of example, a complete mode of realization of the circuit-arrangement according to the invention. In this example the oscillatory circuit 1, 2, 4 constitutes the oscillator circuit of a superheterodyne receiver and is included in the control-grid circuit of the triode portion of a triode-hexode 9. The anode circuit of this triode portion comprises a feed back coil 10 which is coupled to the coil 2. The received high-frequency oscillations are supplied to terminals 11 and 12 and are inductively transmitted to an oscillatory circuit 13 which is included in the circuit of the inner control grid of the hexode portion of the tube 9 and whose tuning condenser 14 is mechanically coupled to the condenser 1 as is diagrammatically indicated by a dotted line 15. The outer control grid of the hexode portion is connected in the usual manner to the control grid of the triode portion whilst in the anode circuit of the hexode portion is included an intermediate-frequency circuit 16 which is coupled to a second intermediate frequency circuit 17. The intermediate-frequency oscillations are taken from the circuit 17 via terminals 18 and 19.

The condenser 1 acts in the above-described manner as a microphone and thus produces low-frequency oscillations which are taken from the condenser 4. This affords the advantage that on the condenser 4 there appears a lower high-frequency voltage than on the condenser 1 so that the low-frequency oscillations can be separated more easily from the high-frequency oscillations.

For the amplification of the low-frequency oscillations use is made of three amplification stages the first and the third of which are constituted by the hexode portion and the triode portion respectively of a triode-hexode 20 whilst for the second stage is utilized the hexode portion of the tube 9 in reflex-connection. As appears from the figure the low-frequency oscillations produced on the condenser are supplied, through a filter 5 which consists of a resistance and a condenser, to the inner control grid of the hexode portion of the tube 20, whereupon the amplified oscillations are supplied, via a resistance coupling of usual composition and a separating filter 21, to the inner control grid of the hexode portion of the tube 9. The low-frequency oscillations which appear in the anode circuit of the last-mentioned hexode portion are taken from a resistance 22 and are supplied to the control grid of the triode portion of the tube 20. The anode circuit of this triode portion comprises a device 7 which serves to vary the capacity 8.

As has been noted hereinbefore, it is possible to obtain a very simple and efficient control of the capacity 8 by utilizing a device based upon the principle of magnetostriction. Two embodiments of such devices are represented by way of example in Figs. 3 and 4.

Figure 3:
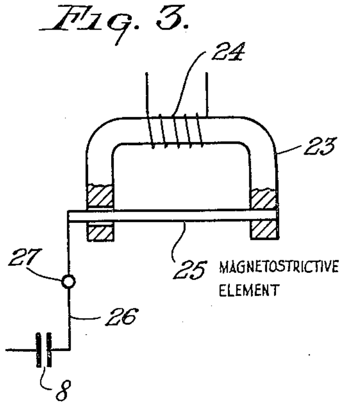

The device shown in Fig. 3 comprises an iron yoke 23 on which is provided a winding 24 which may be included in the output circuit of the amplifier 6 or in the anode circuit of the triode portion of the tube 20 respectively. In the right-hand limb of the yoke 23 is clamped a nickel rod 25 whose left end passes through an aperture in the left-hand limb of the yoke 23. If an alternating current is supplied to the winding 24, the rod 25 is set in longitudinal vibration due to magnetostriction. In this case the left end of the rod 25 may control the condenser 8 by means of a lever 26 with a fulcrum 27.

Figure 4:
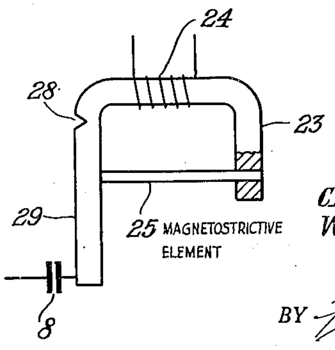

Figure 4 shows a form of construction wherein the left end of the nickel rod 25 bears against the left-hand limb of the yoke 23. This limb of the yoke 23 exhibits a notch 28, owing to which the lower portion 29 can be set into vibration by the nickel rod 25 and thus controls the condenser 8.

What we claim is:

1. A radio receiver having at least one variable capacitive tuning element with a microphonic characteristic, comprising means to apply a direct current polarizing voltage to the variable capacitive tuning element to derive parasitic voltages from the microphonic characteristic thereof, means to amplify the said parasitic voltages, a variable impedance element, transducer means to vary the said variable impedance element in accordance with the said amplified parasitic voltages, and means to couple the said variable impedance element to the variable capacitive tuning element.

2. A radio receiver with at least one tuned oscillatory circuit having a variable capacitive element having a microphonic characteristic and an inductive element, comprising means to apply a direct current polarizing voltage to the variable capacitive element to derive parasitic voltages from the microphonic characteristics thereof, a capacitive element, means to insert said capacitive element in series with the inductive element, means to amplify the said parasitic voltages, a variable impedance element, transducer means to vary the said variable impedance element in accordance with the said amplified parasitic voltages, and means to couple the said variable impedance element to the tuned oscillatory circuit in opposition to the said parasitic voltages.

3. A superheterodyne radio receiver having a local oscillator with a tuned oscillatory circuit, said tuned oscillatory circuit having a variable capacitive element with microphonic characteristics, an inductive element and a capacitive tracking element in series with the inductive element, comprising means to apply a direct current polarizing voltage to the variable capacitive element to derive parasitic voltages from the microphonic characteristics thereof, means to amplify the said parasitic voltages, a variable impedance element, transducer means to vary the said variable impedance element in accordance with the said amplified parasitic voltages, and means to couple the said variable impedance element to the variable capacitive element in opposition to the said parasitic oscillations.

4. A superheterodyne radio receiver having a local oscillator with a tuned oscillatory circuit, said tuned oscillatory circuit having a variable capacitive element, an inductive element and a capacitive tracking element with microphonic characteristics in series with the inductive element, comprising means to apply a direct current polarizing voltage to the capacitive tracking element to derive parasitic voltages from the microphonic characteristics thereof, means to amplify the said parasitic voltages, a variable impedance element, transducer means to vary the said variable impedance element in accordance with the said amplified parasitic voltages, and means to couple the said variable impedance element to the tuned oscillatory circuit in opposition to the said parasitic oscillations.

5. A superheterodyne radio receiver having a local oscillator with a tuned oscillatory circuit, said tuned oscillatory circuit having a first variable capacitive element with microphonic characteristics, an inductive element and a capacitive tracking element in series with the inductive element comprising means to apply a direct current polarizing voltage to the first variable capacitive element to derive parasitic voltages from the microphonic characteristics thereof, means to amplify the said parasitic voltages, said latter means comprising at least one of the translating stages of the radio receiver, a second variable capacitive element, transducer means to vary the said second variable capacitive element in accordance with the said amplified parasitic voltages, and means to couple the said second variable capacitive element in parallel with the first variable capacitive element in opposition to the said parasitic oscillations.

6. A superheterodyne radio receiver having a local oscillator with a tuned oscillatory circuit, said tuned oscillatory circuit having a first variable capacitive element with microphonic characteristics, an inductive element and a capacitive tracking element in series with the inductive element comprising means to apply a direct current polarizing voltage to the first variable capacitive element to derive parasitic voltages of audio frequency from the microphonic characteristics thereof, means to amplify the said parasitic voltages, said latter means comprising a filter having a characteristic at which the parasitic voltages will be transmitted, an amplifier having a plurality of stages connected in cascade relation, a second variable capacitive element, transducer means to vary the said second variable capacitive element in accordance with the said amplified parasitic voltages, and means to couple the said second variable capacitive element in parallel with the first variable capacitive element in opposition to the said parasitic oscillations.

7. In a radio receiver having at least one variable capacitive tuning element with a microphonic characteristic, the circuit comprising means to apply a direct current polarizing voltage to the variable tuning capacitive element to derive parasitic voltages from the microphonic characteristics thereof, means to amplify the said parasitic voltages, a variable capacitive element, transducer means to vary the said variable capacitive element in accordance with the said amplified parasitic voltages, said transducer means comprising a magnetostriction device having an electric input coil connected to the said amplifying means and a mechanical output member coupled to the said variable capacitive element, and means to connect the said variable capacitive element in parallel with the variable capacitive tuning element.

8. In a radio receiver having at least one variable capacitive tuning element with a microphonic characteristic, the circuit comprising means to apply a direct current polarizing voltage to the variable capacitive tuning element to derive parasitic voltages from the microphonic characteristics thereof, means to amplify the said parasitic voltages, a variable capacitive element, a magnetostriction device having an iron yoke, an electric input coil magnetically coupled to the said iron yoke, a nickel rod clamped at one end to the iron yoke and at the free end to a mechanical output member, means to connect the said electric input coil to the said amplifying means, means to connect the mechanical output member to the said variable capacitive element, and means to connect the said variable capacitive element in parallel with the variable capacitive tuning element.

9. In a radio receiver having at least one variable capacitive tuning element with a microphonic characteristic, the circuit comprising means to apply a direct current polarizing voltage to the variable capacitive tuning element to derive parasitic voltages from the microphonic characteristics thereof, means to amplify the said parasitic voltages, a variable capacitive element, a magnetostriction device having an electric input coil, a nickel rod and an iron yoke having one side clamped to one end of the nickel rod and the free side of the yoke having an extension movable with respect to the yoke connected to the free end of the nickel rod, said iron yoke having a magnetic coupling to the said electric input coil, means to connect the electric input coil to the said amplifying means, a coupling between the yoke extension of the said magnetostriction device to the said variable capacitive element, and means to connect the said variable capacitive element in parallel with the variable capacitive tuning element.

CAREL JAN VAN LOON.
WILLEM BEUKEMA.

REFERENCES CITED

The following references are of record in the file of this patent:

UNITED STATES PATENTS

| Number | Name | Date |
|---|---|---|
| 1,794,932 | Usselman | Mar. 3, 1931 |
| 1,844,973 | Ports | Feb. 16, 1932 |
| 2,214,929 | Koschmeider | Sept. 17, 1940 |

FOREIGN PATENTS

| Number | Country | Date |
|---|---|---|
| 64,432 | Denmark | Apr. 23, 1946 |